US011517950B2

(12) United States Patent
Cui et al.

(10) Patent No.: US 11,517,950 B2
(45) Date of Patent: Dec. 6, 2022

(54) REMEDIATION OF HEAVY METAL CONTAMINATED SOIL BY ASYMMETRICAL ALTERNATING CURRENT ELECTROCHEMISTRY

(71) Applicant: The Board of Trustees of the Leland Stanford Junior University, Stanford, CA (US)

(72) Inventors: Yi Cui, Stanford, CA (US); Jinwei Xu, Menlo Park, CA (US); Chong Liu, Chicago, IL (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 380 days.

(21) Appl. No.: 16/843,693

(22) Filed: Apr. 8, 2020

(65) Prior Publication Data
US 2020/0324326 A1    Oct. 15, 2020

Related U.S. Application Data
(60) Provisional application No. 62/832,677, filed on Apr. 11, 2019.

(51) Int. Cl.
*B09C 1/02*       (2006.01)
*B09C 1/08*       (2006.01)
(Continued)

(52) U.S. Cl.
CPC .......... *B09C 1/085* (2013.01); *B01D 11/0211* (2013.01); *B01D 11/0288* (2013.01);
(Continued)

(58) Field of Classification Search
CPC ....... B09C 1/085; B09C 1/02; B01D 11/0211; B01D 11/0288; B01D 11/0292;
(Continued)

(56) References Cited

U.S. PATENT DOCUMENTS 5,391,018 A * 2/1995 Parker ................. B09C 1/06
                                                  405/128.85
5,547,583 A * 8/1996 Alexander ............ C22B 3/282
                                                  210/666
(Continued)

OTHER PUBLICATIONS

Maja Pociecha et al, "Electrochemical EDTA with sacrificial Al anode for remediation of Pb contaminated soil", Environmental Pollution, vol. 158, pp. 2710-2715, Apr. 23, 2010. (Year: 2010).*
(Continued)

*Primary Examiner* — Joseph W Drodge
(74) *Attorney, Agent, or Firm* — Lumen Patent Firm

(57) ABSTRACT

Soil contamination by heavy metals constitutes an important environmental problem, whereas field applicability of existing remediation technologies has encountered numerous obstacles, such as long operation time, high chemical cost, large energy consumption, secondary pollution, and soil degradation. A design and demonstration of a method is provided which is based on asymmetrical alternating current electrochemistry (AACE) that achieves high degrees of contaminant removal for different heavy metals (Cu, Pb, Cd) at different initial concentrations (from 100 to 10,000 ppm), all reaching corresponding regulation levels for residential scenario after rational treatment time (from 30 min to 6 h). No excessive nutrient loss in treated soil was observed and no secondary toxic product was produced. Long-term experiment and plant assay showed the high sustainability of the method and its feasibility for agricultural use.

9 Claims, 18 Drawing Sheets

(51) Int. Cl.
    *B01D 11/02*    (2006.01)
    *B01D 35/06*    (2006.01)
(52) U.S. Cl.
    CPC .......... *B01D 11/0292* (2013.01); *B01D 35/06* (2013.01); *B09C 1/02* (2013.01)
(58) Field of Classification Search
    CPC . B01D 35/06; C02F 1/62; C02F 11/00; C02F 11/006; B08B 3/04; B08B 3/10
    See application file for complete search history.

(56) References Cited

U.S. PATENT DOCUMENTS

| | | | | |
|---|---|---|---|---|
| 5,676,819 | A * | 10/1997 | Lindgren | E21B 43/00 205/43 |
| 5,744,107 | A * | 4/1998 | Fristad | C22B 7/007 423/109 |
| 2012/0325663 | A1 * | 12/2012 | Kim | B09C 1/02 204/515 |
| 2017/0100755 | A1 * | 4/2017 | Lestan | G21F 9/12 |

OTHER PUBLICATIONS

Xu et al, "Remediation of heavy metal contaminated soil by asymmetrical alternating current electrochemistry", Nature Communications, vol. 10, Article No. 2440, Published Jun. 4, 2019. (Year: 2019).*

Probstein et al. Removal of contaminants from soils by electric fields. Science 260, 498-503, 1993.

Zhou et al. Pilot-scale electrokinetic treatment of a Cu contaminated red soil. Chemosphere 63, 964-971, 2006.

Peng et al. Enhancement of ion migration in porous media by the use of varying electric fields. Sep. and Purif. Technol. 118, 591-597, 2013.

Hasan et al. Molecular and ionic-scale chemical mechanisms behind the role of nitrocyl group in the electrochemical removal of heavy metals from sludge. Sci. Rep. 6, 31828, 2016.

Liu et al. A half-wave rectified alternating current electrochemical method for uranium extraction from seawater. Nat. Energy 2, 17007, 2017.

* cited by examiner

- Cl⁻, NO₃⁻, etc.
- Na⁺, K⁺, etc.
- MEDTA$^{2-}$
- NEDTA$^{2-}$
- H₂EDTA$^{2-}$
- Cu, Cd, Pb
- Cu$^{2+}$, Cd$^{2+}$, Pb$^{2+}$
- Ca$^{2+}$, Mg$^{2+}$, etc.
- Carbon fibre
- Chelation site

FIG. 1C continued

REMEDIATION OF HEAVY METAL CONTAMINATED SOIL BY ASYMMETRICAL ALTERNATING CURRENT ELECTROCHEMISTRY

CROSS-REFERENCE TO RELATED APPLICATIONS

This application claims priority from U.S. Provisional Patent Application 62/832,677 filed Apr. 11, 2019, which is incorporated herein by reference.

FIELD OF THE INVENTION

The invention relates to remediation methods of heavy metal contaminated soil. In particular, the invention relates to methods of heavy metal contaminated soil by asymmetrical alternation current electrochemistry.

BACKGROUND OF THE INVENTION

Soil contamination is becoming a serious global environmental crisis especially with the increasing population and demand for agricultural land. Heavy metals in soil resulting from anthropogenic activities is one of the most critical issues, particularly given a large number of widespread poisoning incidents. Considering the high accumulation rate of heavy metals in the earth's upper crust due to the jumping global mining production and industrial demand, economical and efficient remediation of contaminated urban and agricultural land is in pressing need for a sustainable development prospect.

In general cases, heavy metals in soil are in the form of cations and retained on soil particles by electrostatic attraction or forming chemical bonds with organic or inorganic ligand ions. One remediation solution is soil washing with strong chelating agent, which liberates heavy metal cations from the functional groups on the surface of soil particles. However, there are three concerns hindering the application of this technology: (1) the high consumption of chelating agents, (2) the lack of efficient strategy to treat the washing effluent, and (3) the excessive soil nutrient loss after washing.

Another idea is to use high-surface-area sorbent to decrease the mobility and bioavailability of heavy metal cations, but the slow capture speed and low capacity due to its physicochemical adsorption nature are the major drawbacks. The stability of immobilized heavy metals also requires long-term monitoring.

Phytoremediation has been developed in recent years as a high energy efficient method. Nevertheless, the extremely long treatment time makes it only suited for remote areas, and the heavy metals accumulated in biomass may cause secondary pollution.

The above technologies all extract or aggregate heavy metal cations with their oxidation states unchanged. However, the most compact and immobilized states of heavy metals are solid forms as charge-neutral metals or metal alloys. Therefore, the ultimate remediation goal is not only to separate heavy metal cations from soil matrix, but also to reduce them to zero-valent metallic states. This then would not only enhance the remediation capacity, but also provides the opportunity of heavy metal recovery.

Electrochemistry is a method for the reduction of heavy metal cations, and can also differentiate heavy metals from nutrient elements according to their reduction potentials. The current state-of-the-art electrochemical remediation method applies a direct current (DC) electric field to the soil to transport heavy metal species by electroosmosis and electrodeposits them to metallic states on the negative electrode (Probstein et al. *Removal of contaminants from soils by electric fields. Science* 260, 498-503, 1993). However, field application of this technology is limited by the high DC voltage required to maintain a strong electric field (~100 V/m) for electroosmosis (Zhou et al. *Pilot-scale electrokinetic treatment of a Cu contaminated red soil. Chemosphere* 63, 964-971, 2006), the low ion migration speed in soil (Peng et al. *Enhancement of ion migration in porous media by the use of varying electric fields. Sep. and Purif. Technol.* 118, 591-597, 2013), and the large energy losses associated with water splitting at electrodes (Hasan et al. *Molecular and ionic-scale chemical mechanisms behind the role of nitrocyl group in the electrochemical removal of heavy metals from sludge. Sci. Rep.* 6, 31828, 2016). The present invention advances the art with technology to at least overcome some of these concerns and problems.

SUMMARY OF THE INVENTION

The present invention provides an asymmetrical alternating current electrochemistry (AACE) method and system for the remediation of heavy metal contaminated soil. The method has shown a fast remediation speed and limited chemical cost. In one example, the construction involves a recirculating soil washing system and an AACE filtration device. The soil is excavated from the contaminated sites to a treatment cylinder, where it is washed by an ethylenediaminetetraacetic acid (EDTA) solution. It can form chelation complex with heavy metal cations. So, by washing through the soil column, the EDTA solution can extract the heavy metals out. An AACE filter is placed at the end of the treatment cylinder to recycle the EDTA solution by removing the heavy metals from the washing effluent. Then, the recycled EDTA solution is recirculated by a water pump to wash through the soil column again. This cycle continues over and over until the soil becomes clean.

This technology is able to achieve high degrees of contaminant removal for different heavy metals (e.g. Copper, Lead, Cadmium) at different initial concentrations (from 100 to 10,000 ppm), all reaching corresponding regulation levels for residential scenario after rational treatment time (from 30 min to 6 h).

No excessive nutrient loss in treated soil was observed and no secondary toxic product was produced. Long-term experiment and plant assay showed the high sustainability of the method and its feasibility for agricultural use.

In one embodiment, the invention is characterized as a method or system for soil remediation. As such a recirculating soil washing system is provided that provides a chelating agent to soil being treated in a treatment tank. An example of the chelating agent is an ethylenediaminetetraacetic acid (EDTA) solution, but could also be a dimercaptosuccinic acid (DMSA) solution, a 2,3-dimercaptopropanesulfonic acid (DMPS) solution, an alpha lipoic acid (ALA) solution, or a thiamine tetrahydrofurfuryl disulfide (TTFD) solution. A filter is provided in the treatment tank. The filter includes a working electrode and a ground electrode sandwiching a separator. In one example, the filter is an asymmetrical alternating current electrochemistry AACE) filter. An alternating current (AC) electrical input is established between the working electrode and the ground electrode. In one example, the AC electrical input has different positive and negative voltage excursions. For example, the alternating current (AC) electrical input ranges from −10V to +5V.

In another example, the AC could range from −20 V to +20 V. The positively biased period of the working electrode could range from 0.1 to 1 ms. The negatively biased period of the working electrode could range from 1 to 5 ms. Different waveforms of alternating current could be used as well such as a sinusoidal wave, a stepwise waveform or a biphasic waveform.

Heavy metal cations are bound from the soil being treated by the chelation sites on the working electrode when the working electrode is positively biased with respect to the ground electrode.

The heavy metal cations on the working electrode are electrochemically reduced to solid particles when the working electrode is negatively biased with respect to the ground electrode.

Examples of heavy metal cations are Cu, Pb, Cd, Hg, Cr, As, Ni, Zn, Fe.

BRIEF DESCRIPTION OF THE DRAWINGS

The figures described herein are grey scale representations of original color figures. For color representations of these figures the reader is referred to Appendix A of U.S. Provisional Patent Application 62/832,677 filed Apr. 11, 2019, which is incorporated herein by reference.

FIG. 1A shows a schematic of an AACE remediation system. Ethylenediaminetetraacetic acid (EDTA) solution is recirculated to wash the contaminated soil. The AACE filter recovers heavy metal cations from the washing effluent and recycles the EDTA solution for repeated use. FIG. 1B shows an illustration of the AACE filter, which is composed of two parallel Ami-PC electrodes and a separator. FIG. 1C shows the waveform of the applied bias and the physical process in the AACE filtration. In Step I, all the ions are randomly dispersed in the washing effluent. In Step II, a bias of 5V applied, an electrical double layer is established on the surface of the Ami-PC electrode, with anions in the inner layer. The chelation sites will bind heavy metal cations and stabilize the MEDTA$^{2-}$ on the electrode surface. In Step III, a bias of −10V applied, heavy metal cations are electrochemically reduced to zero-valent particles. EDTA anions are repelled by the negative bias due to less affinity with the charge-neutral particles. Soil nutrient elements are reserved in this process because of their lower reduction potential.

FIGS. 2A-C show a comparison between the AACE remediation and two other methods on treating three soil samples spiked with 10,000 ppm Cu (FIG. 2A), 1,000 ppm Pb (FIG. 2B) and 100 ppm Cd (FIG. 2C), respectively. 'No bias', using the same experiment set up as the AACE method and no bias is applied to the electrodes. 'Fresh EDTA', using fresh EDTA solution to wash the spiked soil without recirculation. Green region represents the CHHSL for residential scenario. FIG. 2D shows AACE filtration efficiency (the percentage of the heavy metal cations electrodeposited by the AACE filter from the washing effluent) as the function of soil washing flow rate. The highest flow rate providing a filtration efficiency above 90% was chosen for corresponding treatment. FIG. 2E shows concentration of Mg in soil under three different treatment methods. Flow rate, 0.1 ml/min. FIG. 2F shows a comparison of the filtration efficiency of the AACE method and the DC method. 'DC', using a −10 V DC for the electrochemical filtration. Flow rate, 0.1 ml/min. Error bars, mean±s.d. (n=3).

FIG. 3A shows an SEM image showing the morphology of the heavy metal particles extracted by the AACE method. Scale bar, 5 μm. FIG. 3B shows an EDS showing the chemical nature of the extracted particles, where strong peaks of Cu, Pb and Cd were found. FIG. 3C shows an SEM image showing that the Ami-PC electrode was covered by a uniform shell when using a −10 V DC in place of the asymmetrical alternating current for the filtration. Scale bar, 5 μm. FIG. 3D an EDS of the uniform shell showing a large accumulation of Ca and a small quantity of heavy metals. FIG. 3E a comparison of XPS of the heavy metal species extracted by the AACE method and the DC method.

FIG. 4A shows extraction ability of the recycled EDTA solution and the AACE filtration efficiency as functions of treatment cycles. Total 25 contaminated soil samples (10,000 ppm Cu) were prepared. In each cycle, the same EDTA solution was used to wash a contaminated soil sample followed by the AACE filtration, and the extraction ability of the EDTA solution was examined by the mass of Cu extracted from the soil. The AACE filter was regenerated by acid elution after the 14th cycle. FIGS. 4B-C show plant assay using pea (*Pisum sativum*) sprouts. After the AACE remediation, the Cd level in the planted pea sprouts met the International Food Standards. Using fresh EDTA to wash the contaminated soil caused stunted growth of the pea sprouts. Boxplots represent median, 25th and 75th percentile. Whiskers indicate the maximum and minimum (n=10).

DETAILED DESCRIPTION

AACE Remediation Method

Figure 1A:
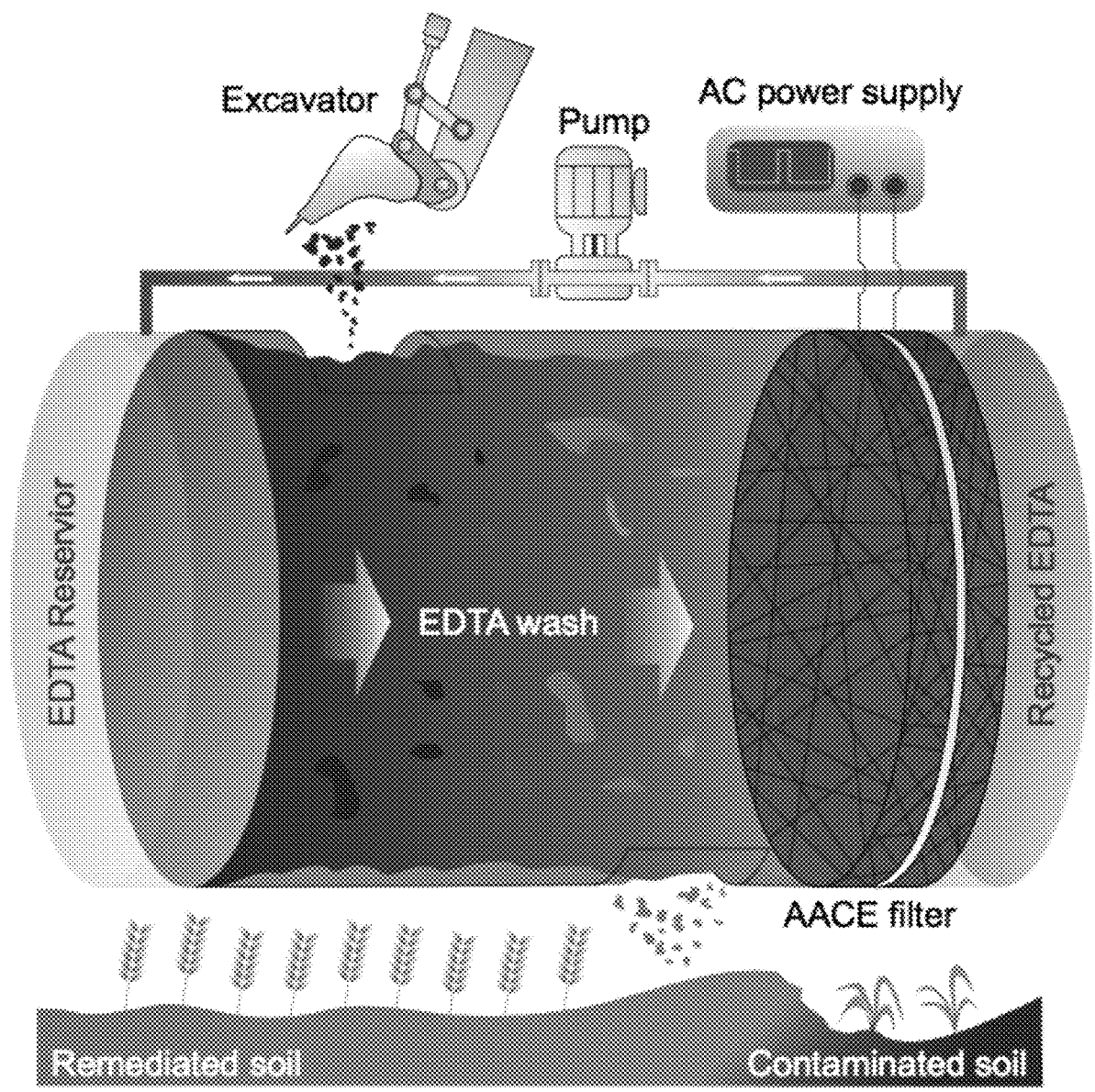
FIGS. 1A-C show the working principle of the asymmetrical alternating current electrochemistry (AACE) method and system according to an exemplary embodiment of the invention.
Figure 1B:
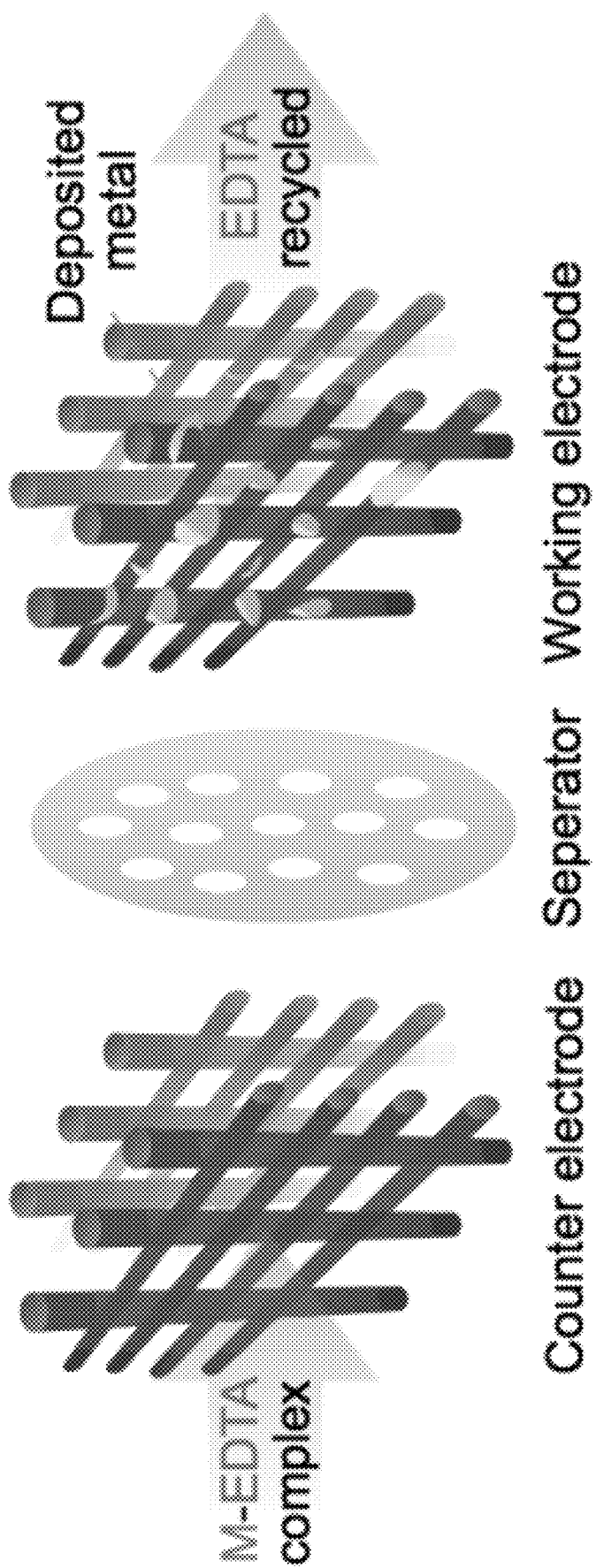

A remediation technology is provided with this invention with the key concept of asymmetrical alternating current electrochemistry (AACE). In an exemplary embodiment as shown in FIG. 1A, the construction involves a recirculating chelating agent washing system and an AACE filtration device. The soil is excavated from contaminated sites to a treatment cylinder, with two ethylenediaminetetraacetic acid (EDTA) solution reservoir tanks attached on each side. A centrifugal pump circulates the EDTA solution to wash through the contaminated soil column. The soil-sorbed heavy metal cations are mobilized by forming heavy metal-EDTA complex and transported to the AACE filter, which is connected to an alternating current (AC) power supply. FIG. 1B shows an illustration of the AACE filter, composed of two parallel amidoxime-functionalized porous carbon (Ami-PC) electrodes and a separator. After the AACE filtration, heavy metal cations are liberated from their chelation complex and electrodeposited to metallic states on the working electrode, and the EDTA solution is recycled for repeated use. The Ami-PC electrode was fabricated by coating a carbon felt with a precursor slurry of polyacrylonitrile (PAN) and activated carbon, followed by a hydrothermal reaction to substitute the nitrile functional groups in PAN with amidoxime functional groups (Liu et al. *A half-wave rectified alternating current electrochemical method for uranium extraction from seawater. Nat. Energy* 2, 17007, 2017), (See also FIG. 1 in Appendix B of U.S. Provisional Patent Application 62/832,677 filed Apr. 11, 2019, which is incorporated herein by reference).

Figure 2A:
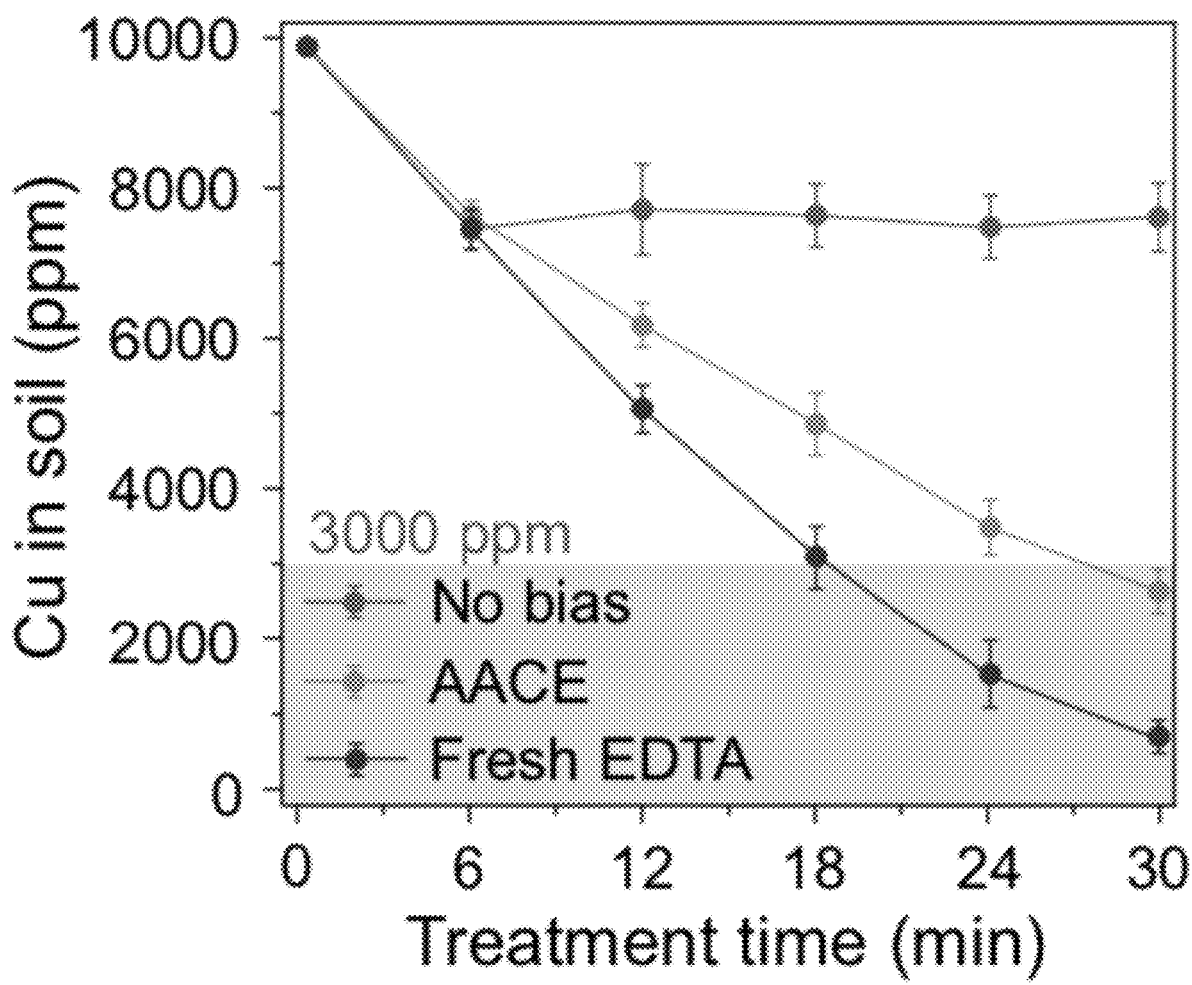
FIGS. 2A-F show remediation performance of the AACE method according to an exemplary embodiment of the invention.
Figure 2B:
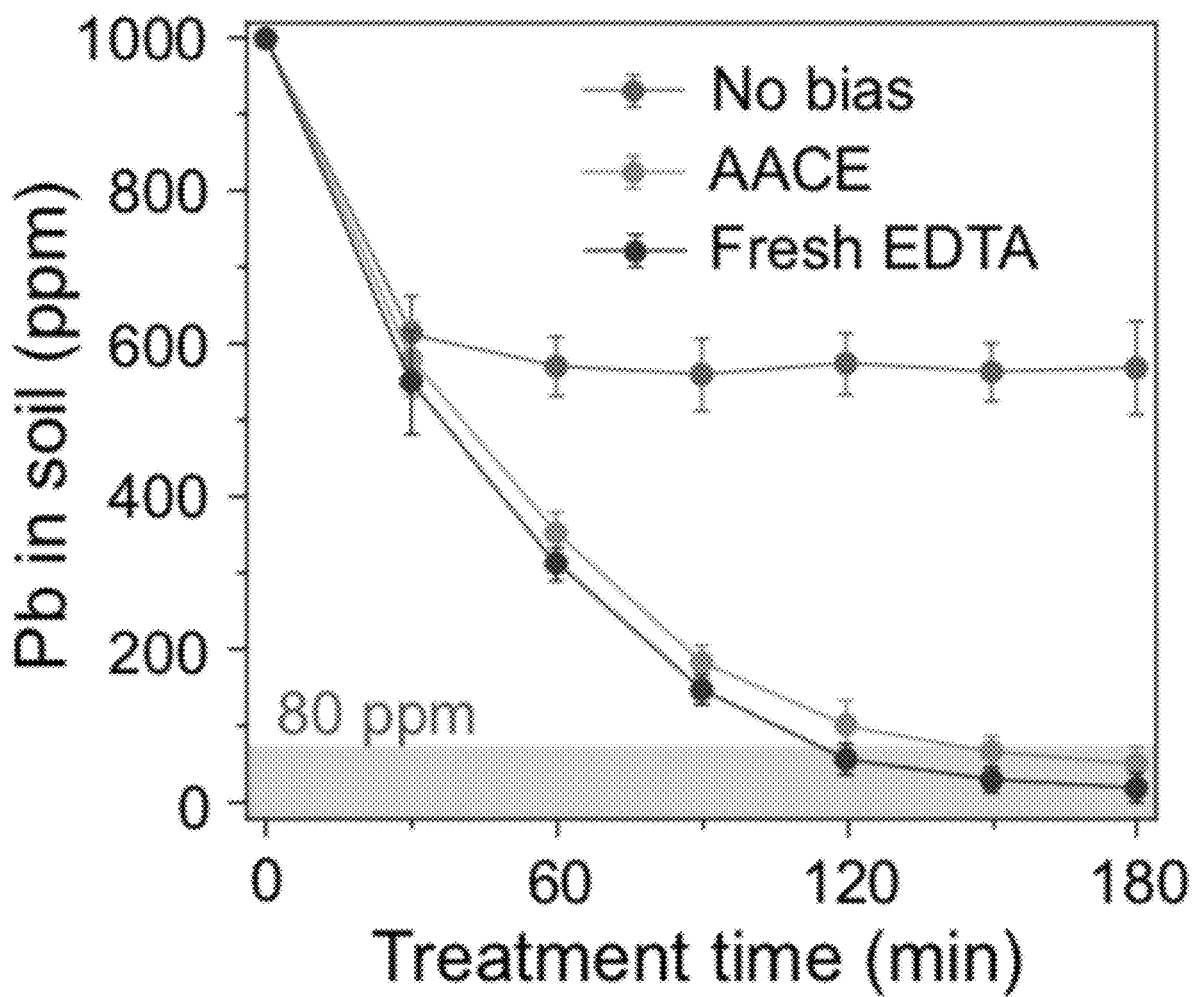
Figure 2C:
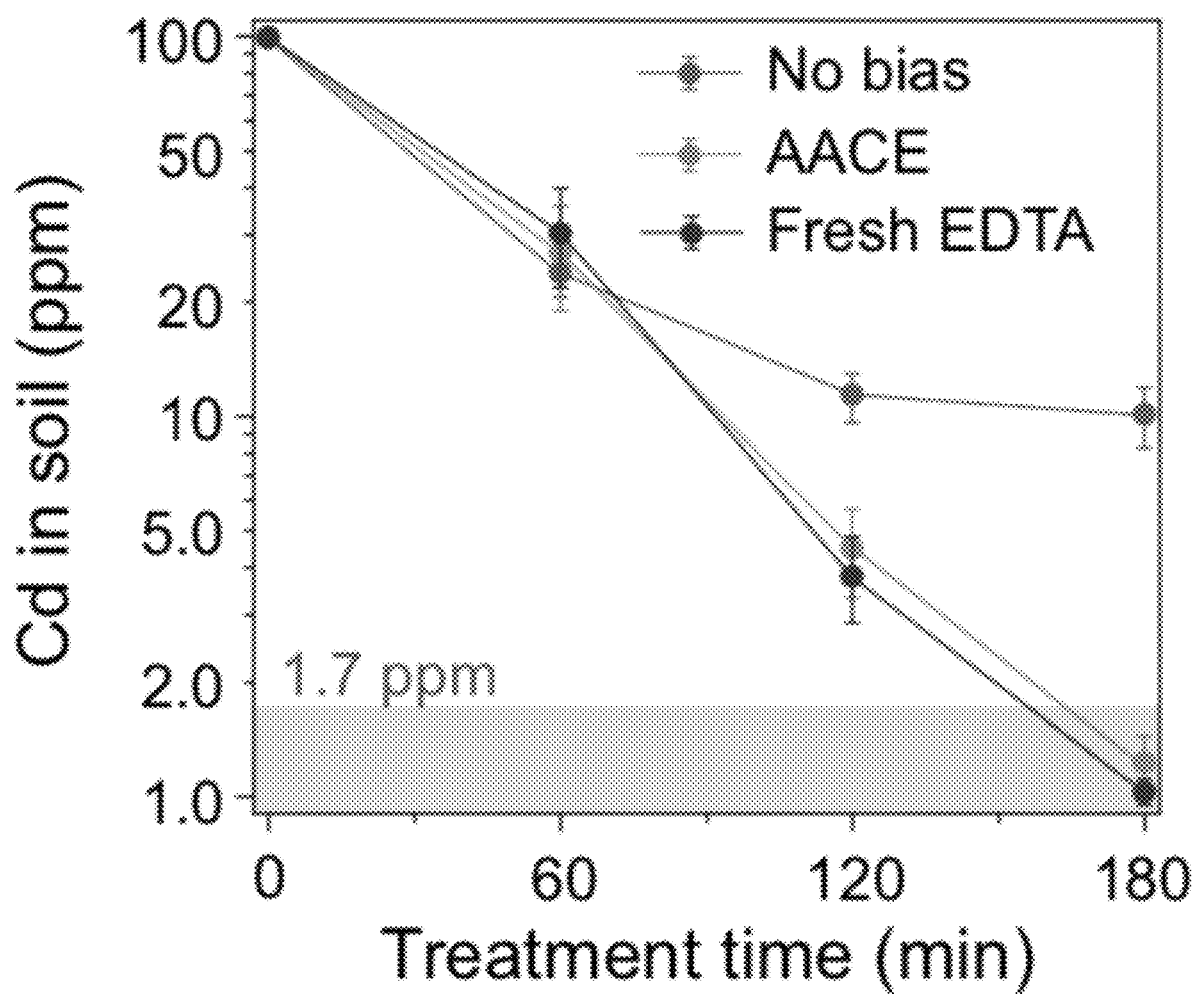

The amidoxime has two functions: to modify the carbon felt surface to hydrophilic thus to fully utilize the high surface area of the electrodes and, more importantly, to provide strong chelation sites (See FIG. 2 in Appendix B of U.S. Provisional Patent Application 62/832,677 filed Apr. 11, 2019, which is incorporated herein by reference) that can compete with EDTA to bind heavy metal cations and hence promote the electrodeposition efficiency. The nano-size activated carbon (~40 nm) serves to enhance the electrical conductivity of the amidoxime polymer. FIG. 3A in Appendix B of U.S. Provisional Patent Application 62/832,677 filed Apr. 11, 2019, which is incorporated herein by reference, shows the morphology of the Ami-PC electrodes, with a pore size ranging from tens to hundreds of micrometres and a fibre diameter of ~20 μm (3A) and the magnified SEM image in FIG. 3B of the same Appendix B shows the homogeneous amidoxime coating on carbon fibres.

Figure 1C:
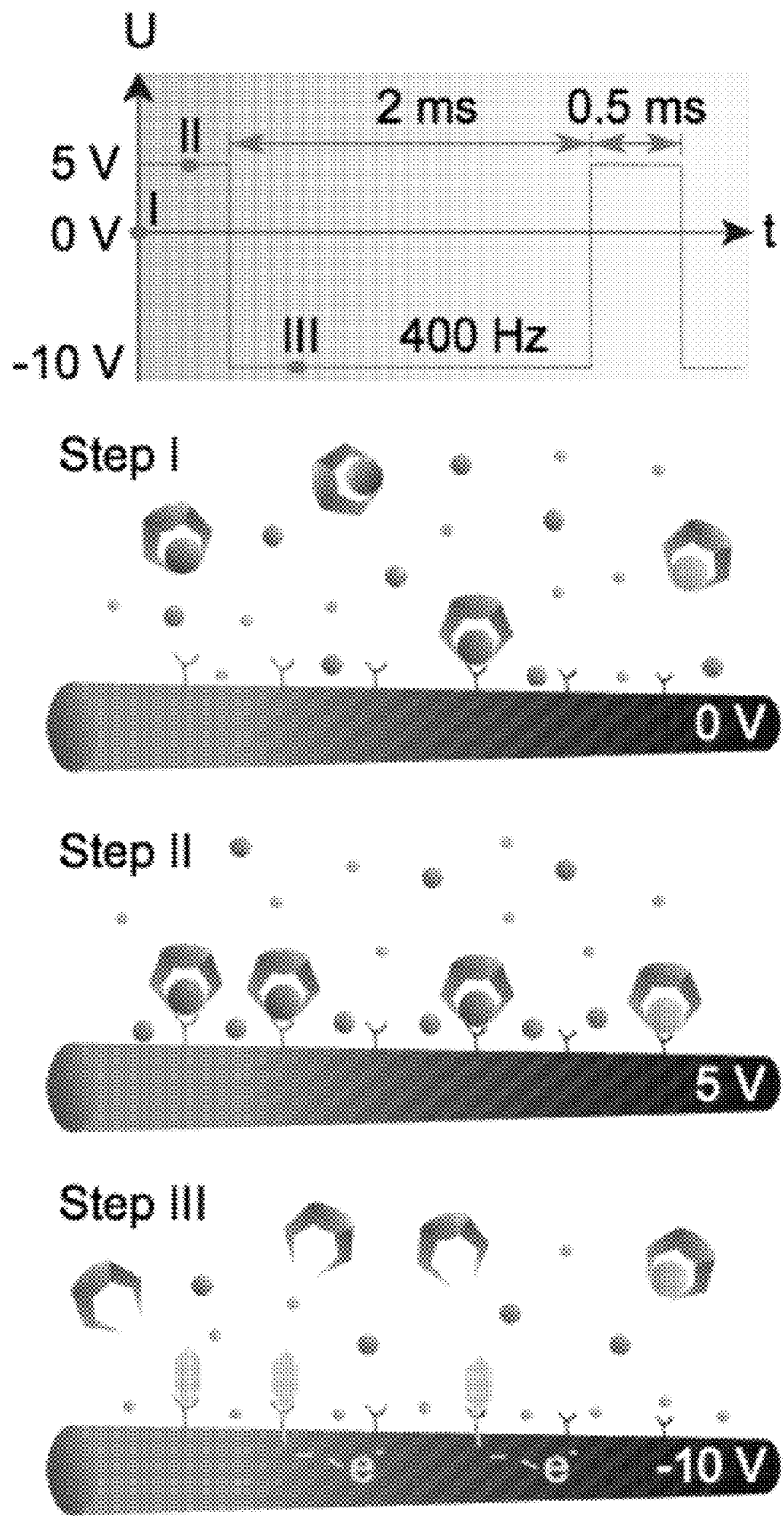

For the washing effluent, calculation using Visual MINTEQ shows that ~100% extracted heavy metal cations occur as anionic complex ($MEDTA^{2-}$). If a DC voltage were applied, the negative charge of $MEDTA^{2-}$ would reject the negative electrode due to Coulomb repulsion, with limited heavy metal cations electrodeposited and a great energy loss in water splitting. To address this issue, a new method, i.e. AACE method, was developed that applies an asymmetrical alternating voltage to the Ami-PC electrodes (FIG. 1C). The working electrode was alternating between 5 V and −10 V with durations of 0.5 ms and 2 ms, respectively, and the counter electrode was connected to ground.

The process of the AACE method is explained in three steps in the schematics of FIG. 1C. In Step I, all the ions are randomly distributed in the washing effluent. In Step II, a 5 V bias is applied, and ions start to migrate and establish an electrical double layer on the surface of the Ami-PC electrode, with anions in the inner layer. The chelation sites of amidoxime will compete with EDTA to bind heavy metal cations thus stabilize the $MEDTA^{2-}$ on the electrode surface. In Step III, the bias is reversed to −10 V, electrochemically reducing heavy metal cations to zero-valent particles. EDTA anions will lose their affinity for these charge-neutral particles and be repelled by the negative bias. During the soil washing process, some soil nutrient cations, such as calcium ($Ca^{2+}$) and magnesium ($Mg^{2+}$), can also be extracted and form chelation complex ($NEDTA^{2-}$) like heavy metals. Same as $MEDTA^{2-}$, $NEDTA^{2-}$ has negative charges and can be adsorbed to the electrode surface in Step II. However, these nutrient cations do not undergo electrodeposition in Step III because of their lower reduction potential, thus remain in the recycled EDTA solution and are given back to the soil matrix by the recirculating soil washing, which prevents future soil nutrient loss.

Remediation Performance

To quantitatively evaluate the remediation performance of the AACE method, a series of experiments using synthetically contaminated soil were conducted. The soil used in this study was collected from the O'Donohue Family Stanford Educational Farm. The soil was then air-dried at 70° C., and passed through a 2-mm sieve to remove coarse fragments. Contaminated soil samples with different heavy metal (Cu, Pb, Cd) concentrations were synthetically prepared by thoroughly mixing the clean soil samples with the corresponding nitrate-salt solutions. After the spiking process, the contaminated soil samples were air-dried and aged for one month at 80° C., in order to simulate practical polluted soil by decreasing the solubility and mobility of the heavy metals (See FIG. 5 in Appendix B of U.S. Provisional Patent Application 62/832,677 filed Apr. 11, 2019, which is incorporated herein by reference). Characteristics of the fresh and the aged soil samples, including soil texture, organic carbon, pH, and cation exchange capacity are provided in Table 1 in Appendix B of U.S. Provisional Patent Application 62/832, 677 filed Apr. 11, 2019, which is incorporated herein by reference, corroborating that the aging process didn't change the soil properties from that in field.

Considering the large variation in hazardous level among different contaminated sites and the disparate safety standards for different heavy metals, three synthetically contaminated soil samples were prepared by spiking with 10,000 ppm Cu, 1,000 ppm Pb and 100 ppm Cd, respectively. The setting of their content is according to their toxicity and their typical concentrations found in contaminated sites. The heavy metal concentrations in these three soil samples during remediation treatments are shown in FIGS. 2A-C. The AACE method successfully reduced the concentrations of Cu, Pb and Cd in the contaminated soil samples to below their California Human Health Screening Levels (CHHSL) for residential scenario, which is similar compared to using fresh EDTA solution to wash the spiked soils. In addition, the AACE method recycled the EDTA solution for repeated use and therefore consumed very limited EDTA. For comparison, experiments with no bias on the electrodes failed to extract heavy metals from soil after the first soil washing cycle, because the EDTA solution had been saturated with heavy metal cations.

Figure 2D:
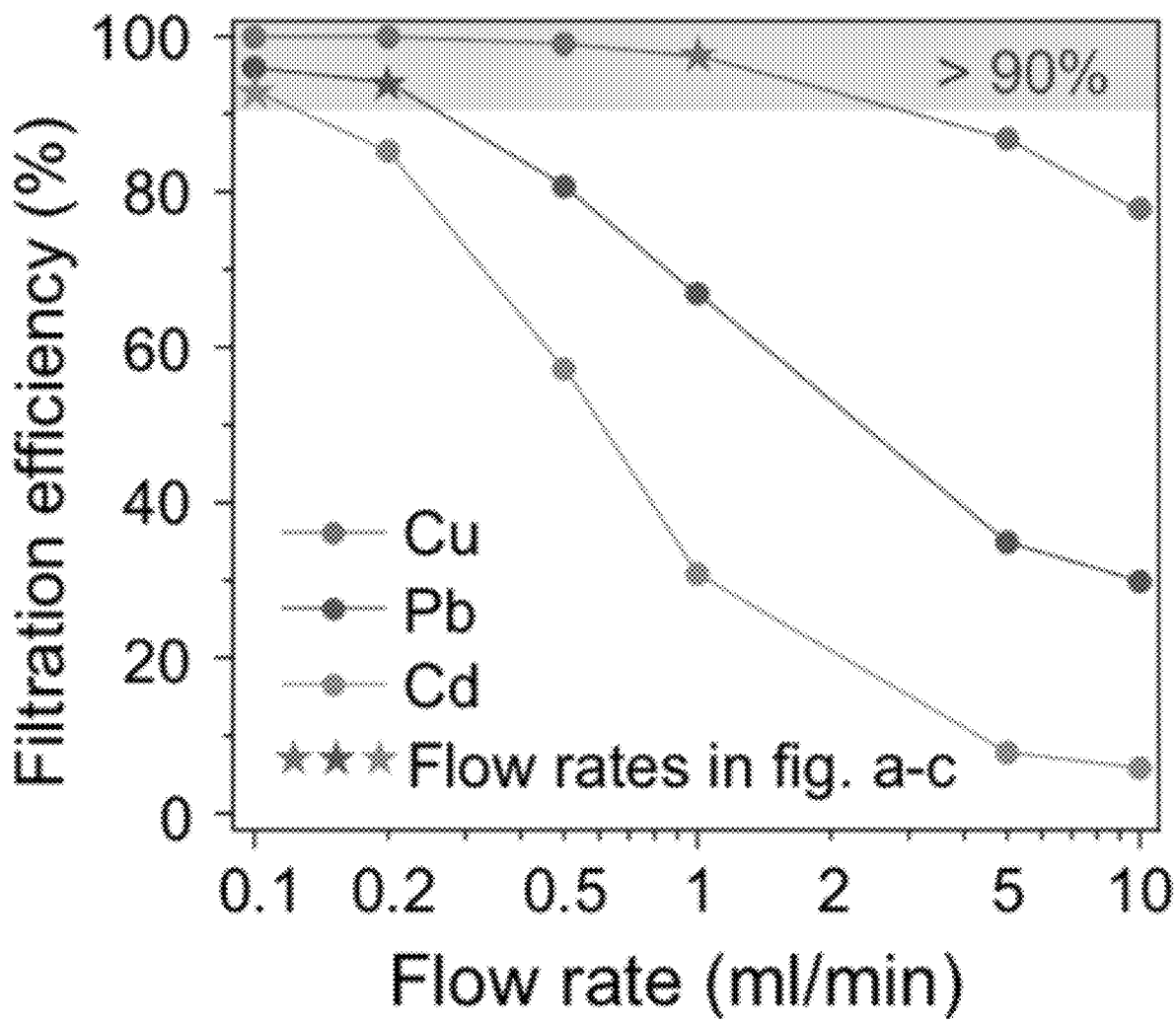
Figure 2E:
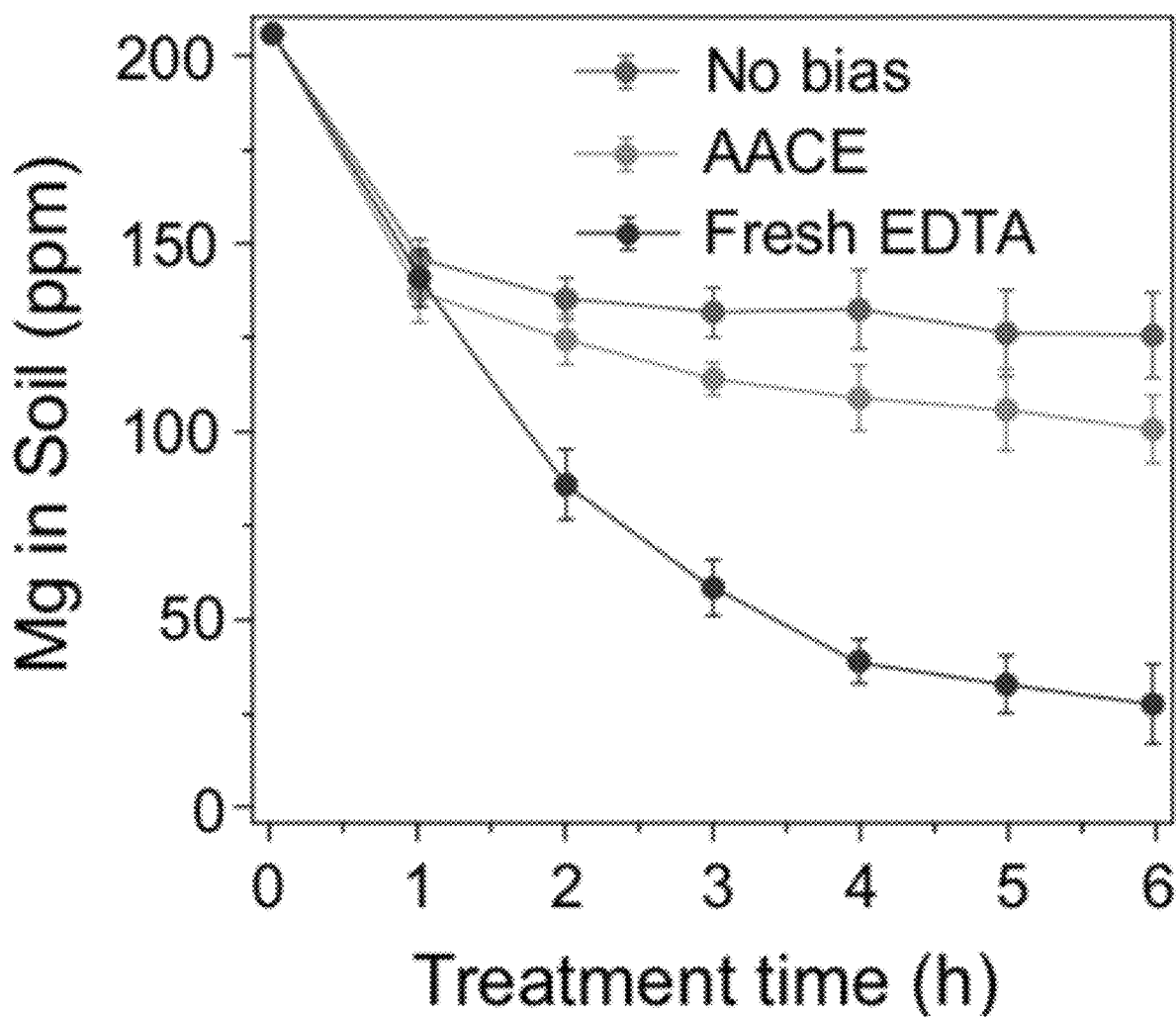
Figure 3A:
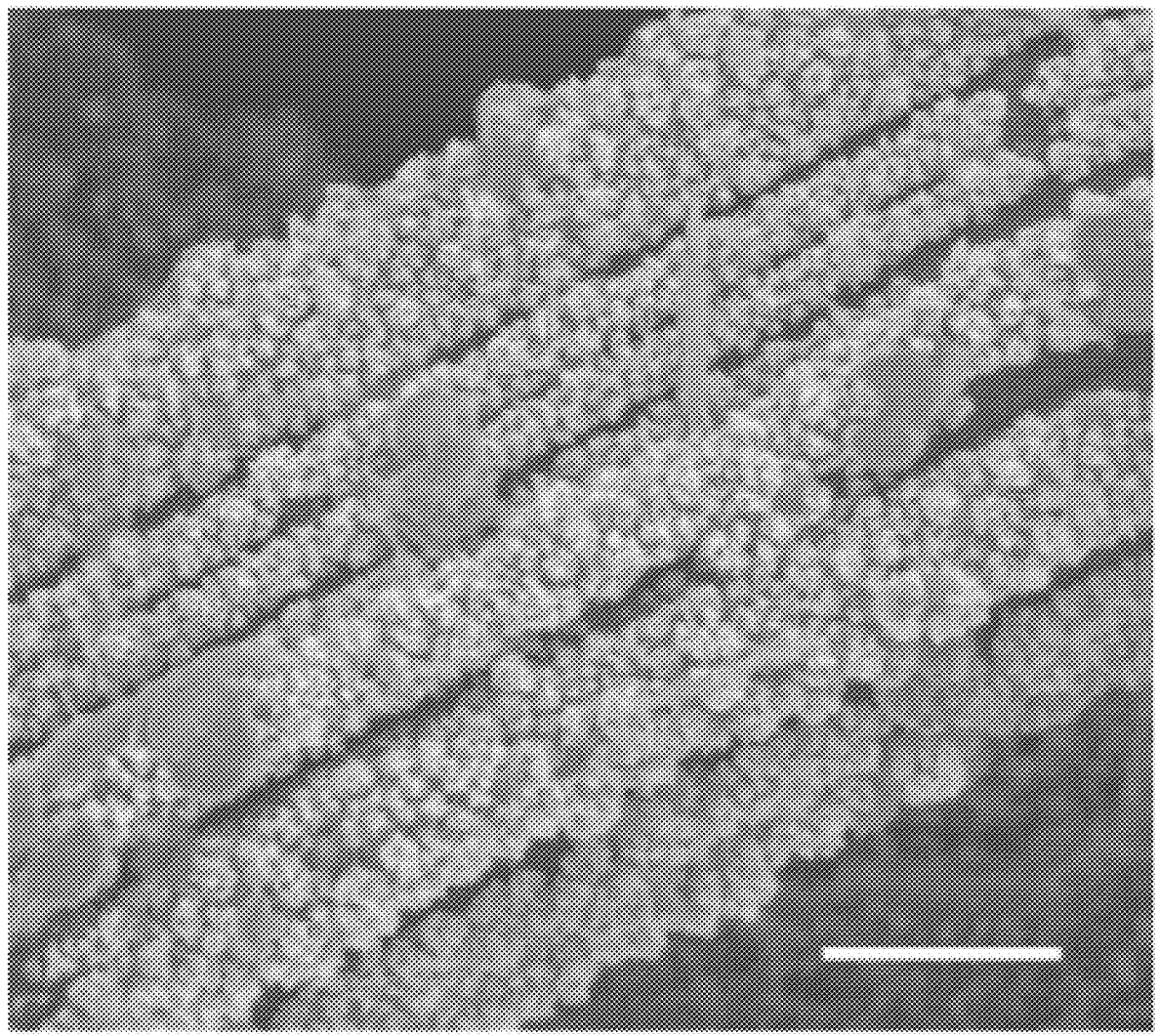
FIGS. 3A-E show according to an exemplary embodiment of the invention results of the AACE remediation mechanism.

FIG. 2D shows that the ability of the AACE filter to recover heavy metals from washing effluent (defined as filtration efficiency) can be promoted by allowing a slower soil washing flow rate. The ultimate flow rate should be determined according to different contamination conditions: a too-high flow rate yielded a poor filtration efficiency and a large amount of heavy metals remain in the recycled EDTA solution, while a too-low flow rate makes the remediation process slow and lead to more side reactions, hence waste electricity energy. Therefore, the highest flow rate giving a filtration efficiency above 90% was chosen for corresponding soil sample, as star marked in FIG. 2D. The concentration of magnesium in soil was also monitored during three different treatment methods at a flow rate of 0.1 ml/min (FIG. 2E). For nutrient metal ions (Na+, Mg2+, etc.), they can also be washed out by the EDTA solution. However, they cannot be extracted out by the AACE filter because of their lower standard reduction potential. After the first washing cycle, the nutrient metal concentration in the EDTA solution established an equilibrium with the nutrient metal concentration in the soil. Consequently, when the recycled EDTA solution was used to wash the soil in the following cycles, it didn't wash out more nutrient metal ions. However, excessive nutrient loss happened when using fresh EDTA to wash the soil. To demonstrate the capability of the AACE method to treat mixed contamination, a soil sample simultaneously spiked with 10,000 ppm Cu, 1,000 ppm Pb and 100 ppm Cd was prepared. After 6 h of AACE treatment at a flow rate of 0.1 ml/min, the concentrations of Cu, Pb and Cd in soil were reduced to 2,874 ppm, 47 ppm and 1.2 ppm respectively, all below the CHHSL (See FIG. 6 in Appendix B of U.S. Provisional Patent Application 62/832,677 filed Apr. 11, 2019, which is incorporated herein by reference). Experiment using a −10 V DC instead of the asymmetrical AC was carried out to treat the mixture contaminated soil.

Figure 2F:
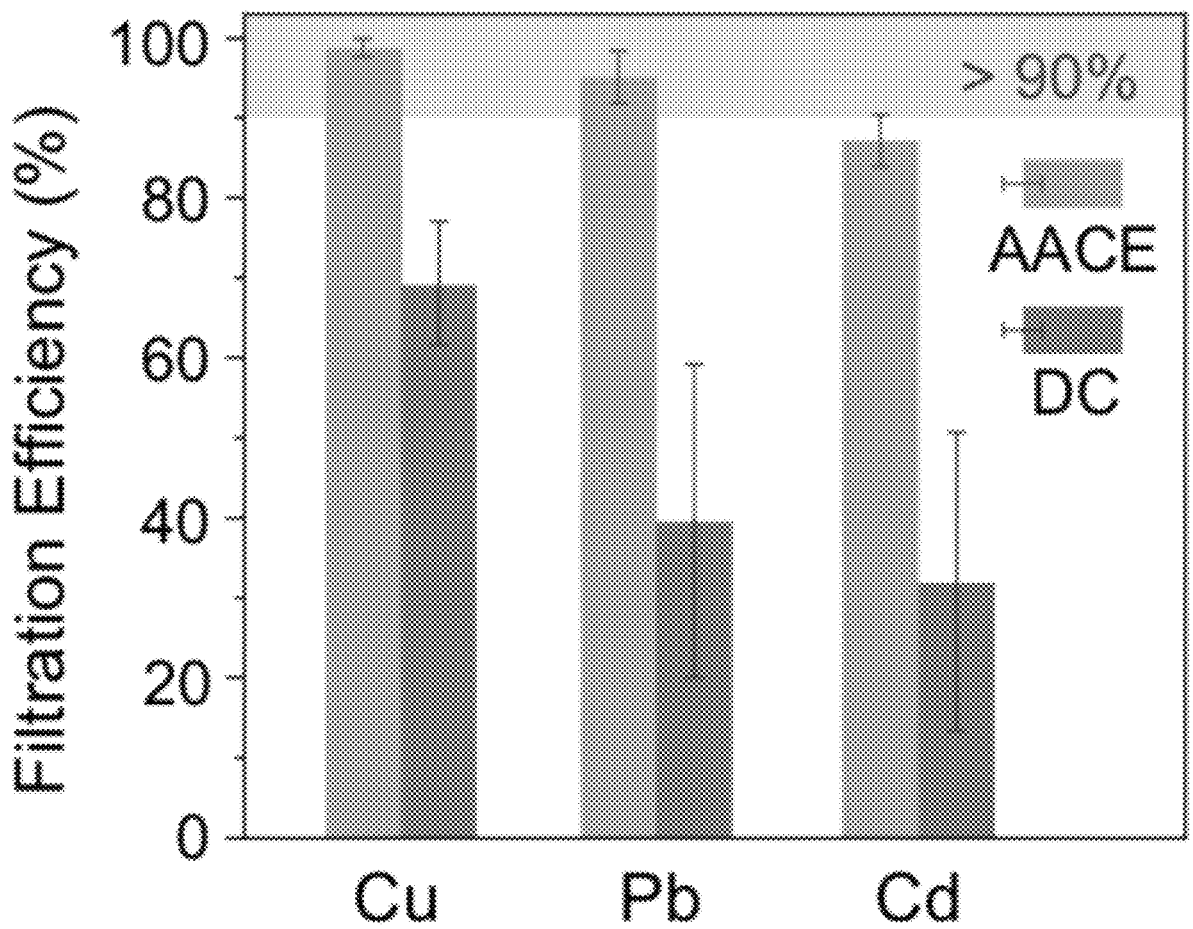

FIG. 2F shows that, at the same flow rate of 0.1 ml/min, the DC method can only extract heavy metals from the washing effluent by 30-70%, which is much lower than the AACE method.

Remediation Mechanism

Figure 3B:
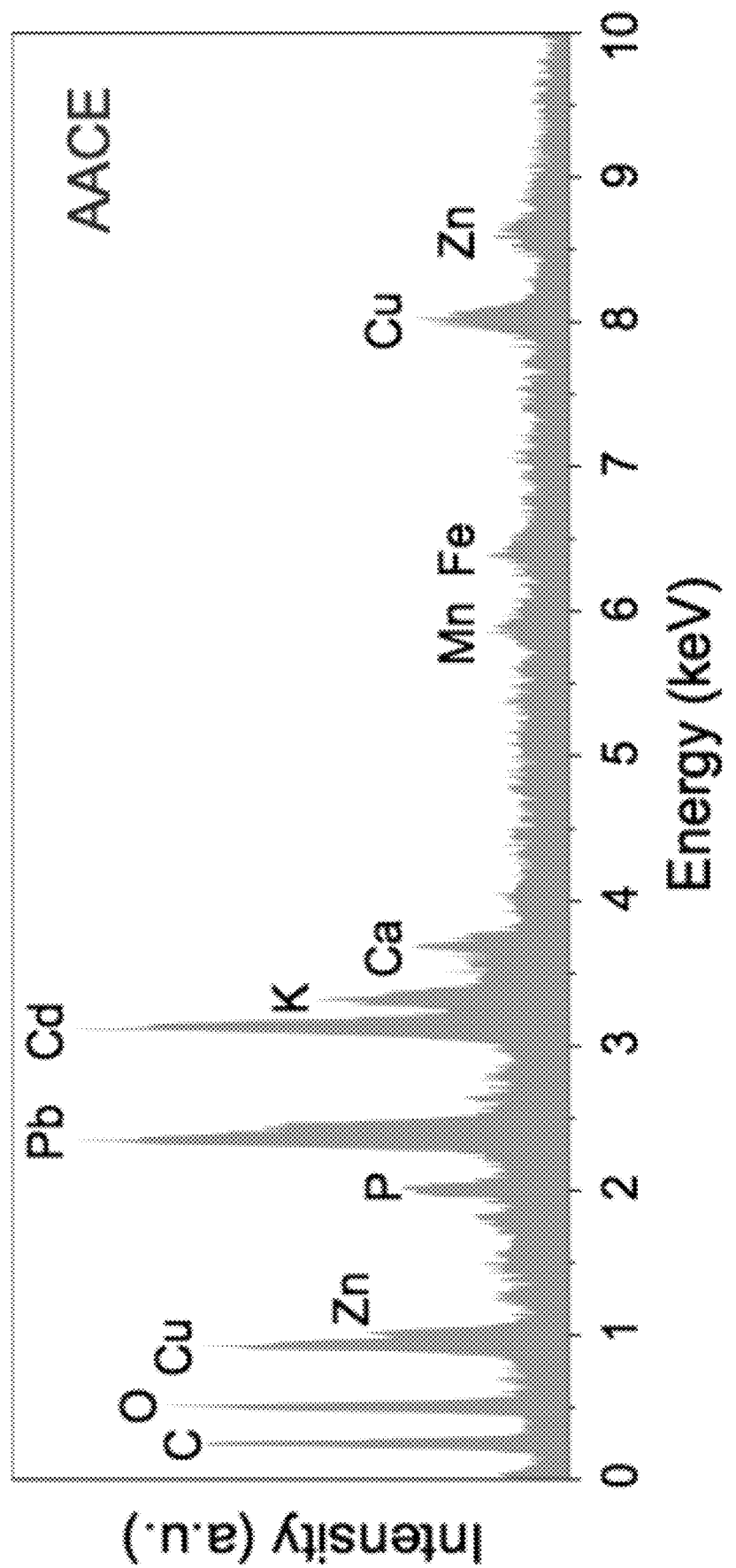
Figure 3C:
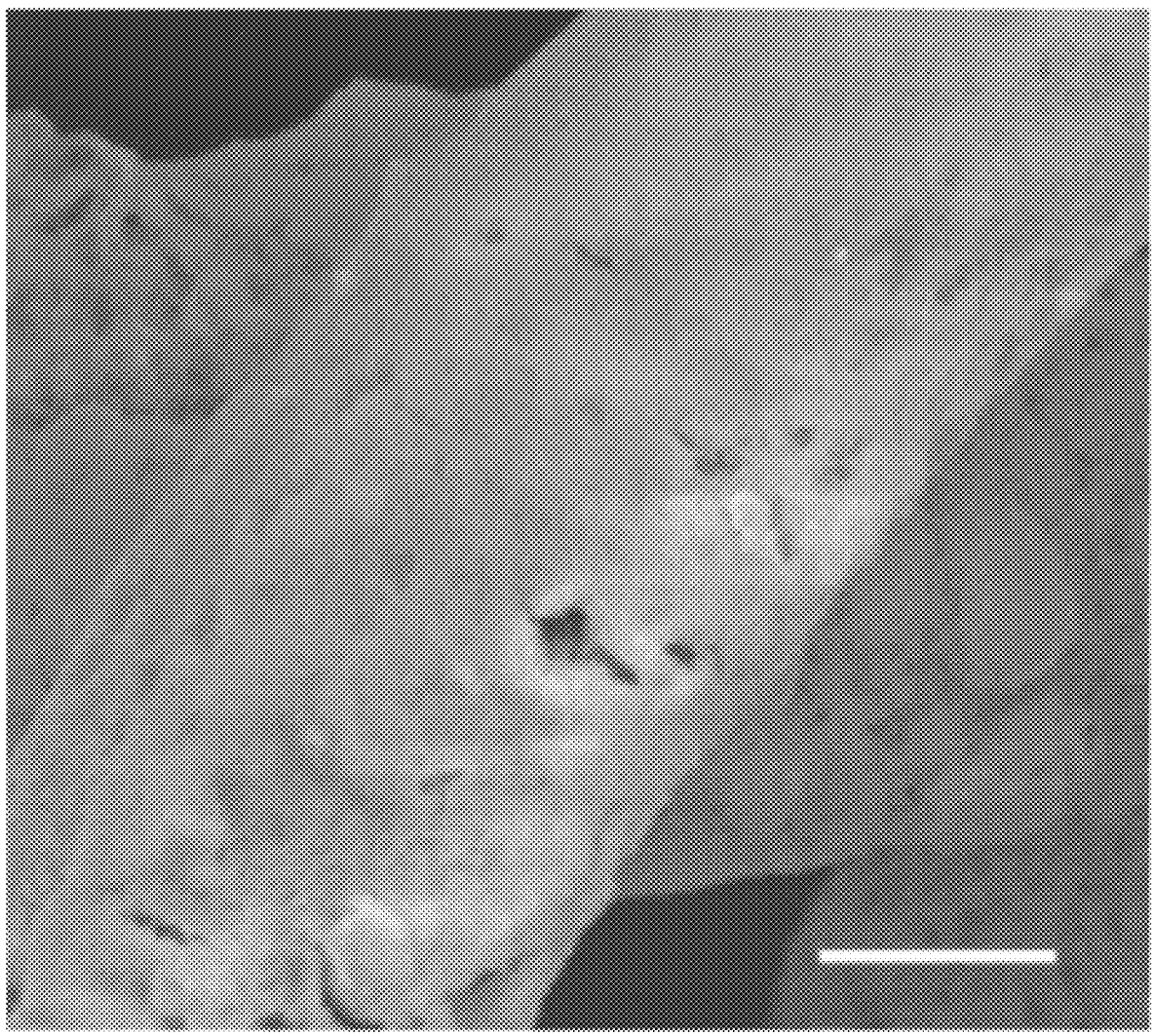
Figure 3D:
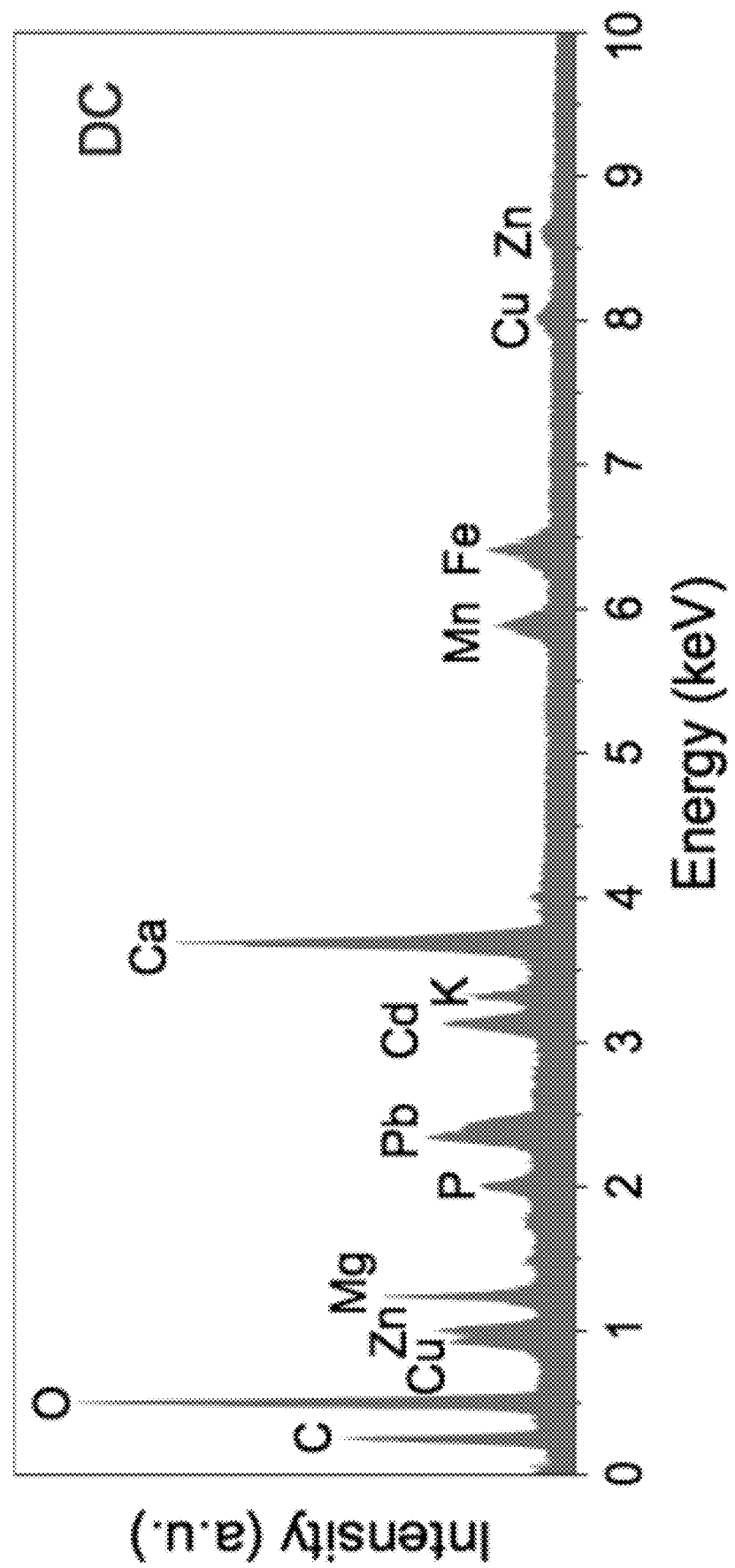
Figure 3E:
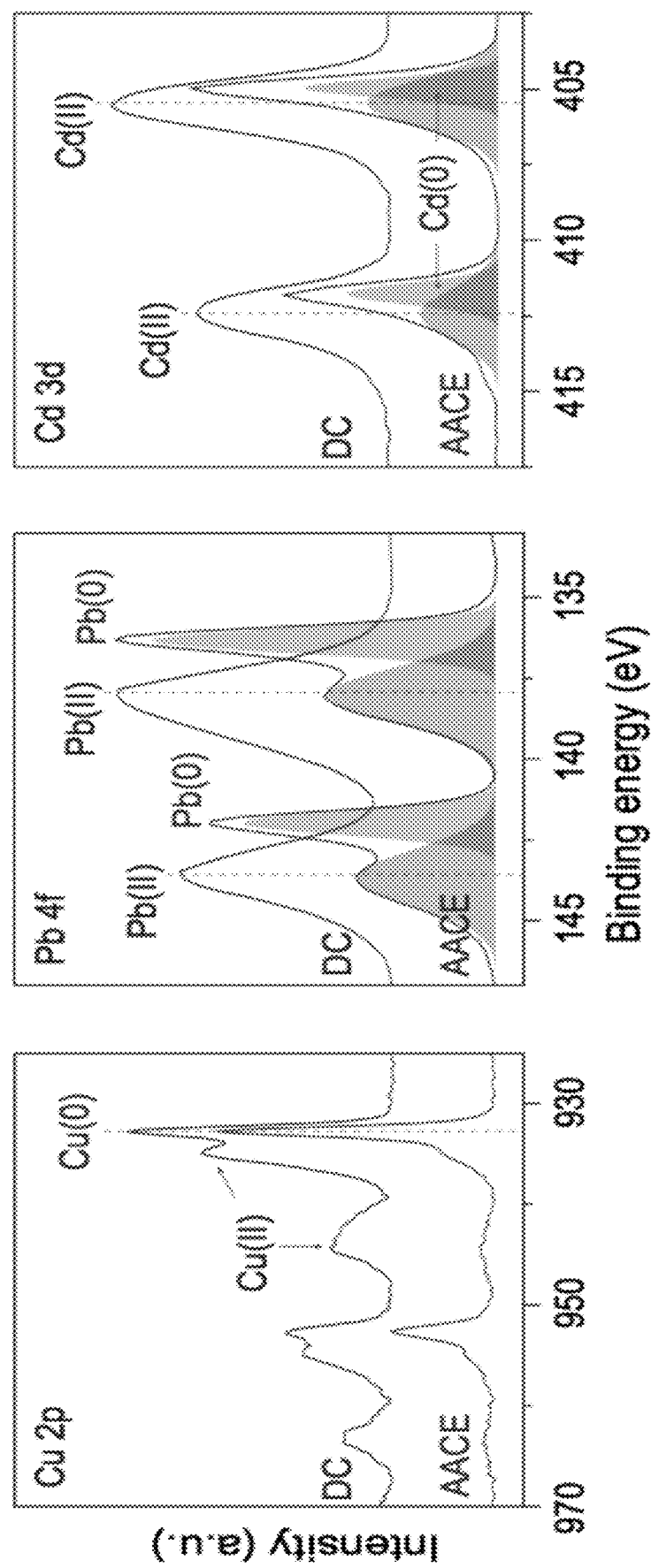

The heavy metal species extracted by the AACE method and the DC method were further characterized and compared with each other to investigate the remediation mechanism. A synthetically contaminated soil sample spiked with an equivalent quantity of Cu, Pb and Cd (1,000 ppm each) was prepared for the investigation. After six cycles of soil washing (3 h at a soil washing flow rate of 0.2 ml/min), the morphologies of the heavy metal species on the Ami-PC electrode were characterized by SEM (FIG. 3A and FIG. 3C). In the AACE method, there are many micrometre-sized heavy metal particles attached onto the Ami-PC electrode. In contrast, the Ami-PC electrode with DC bias was covered with a uniform thick shell, showing no crystal structure. The electrodes were further characterized by energy-dispersive X-ray spectroscopy (EDS) (FIG. 3B and FIG. 3D). Strong peaks of Cu, Pb and Cd can be found for the AACE case, while the DC method accumulated a large amount of Ca element on the electrode. Considering the low electrochemical reduction potential of $Ca^{2+}$ and the low solubility of $Ca(OH)_2$, the DC extraction is primarily due to precipitation at the high pH zone resulted from hydrogen generation near the negative electrode. To check this hypothesis, X-ray photoelectron spectroscopy (XPS) was performed to determine the chemical state of the heavy metal species extracted by the DC method and the AACE method (FIG. 3E). In the DC case, the strong satellite peaks in the Cu 2p spectrum confirmed the copper species as Cu(II). While for the AACE method, the XPS peaks were observed at 932.8 and 952.6 eV with weak shaken-up structure indicating that most of the copper species existed as metallic state. For the Pb 4f and Cd 3d spectrum, observed peaks of the Pb and Cd species extracted by the DC method were coincident with that of their metal hydroxides. As for the AACE method, peak separation analysis suggested that the extracted Pb and Cd species were a mixture of zero-valent state and divalent state with a majority existing as metal. Therefore, the AACE method successfully recovered the heavy metal cations to the zero-valent particles attached on the electrode. However, for the DC method, most of the heavy metal cations were precipitated with the hydroxyl ions produced by the negative bias on the electrode. This precipitation mechanism failed to reduce the heavy metal cations to zero-valent states and many soil nutrient cations like $Ca^{2+}$ were also extracted from the washing effluent. Unlike metals or metal alloys, these metal hydroxides were not conductive and prevented further removal, hence reduced the filtration efficiency in the long term. Moreover, these precipitations were loosely attached on the electrode and would be washed off after accumulation to some extent (See FIG. 7 in Appendix B of U.S. Provisional Patent Application 62/832,677 filed Apr. 11, 2019, which is incorporated herein by reference). This accounted for the large standard deviation of the DC filtration efficiency in FIG. 2F. Lastly, the crystal structures of Cu, Pb and Cd particles extracted by the AACE method were examined using transmission electron microscope (TEM). The TEM images shown in FIG. 8, in Appendix B of U.S. Provisional Patent Application 62/832,677 filed Apr. 11, 2019, which is incorporated herein by reference, show polycrystalline particles with the lattice spacing about 2.6 Å, 3.5 Å and 2.8 Å, which correspond to (110) plane of Cu, (110) plane of Pb and (002) plane of Cd, respectively.

Long-Term Performance and Plant Assay

Figure 4A:
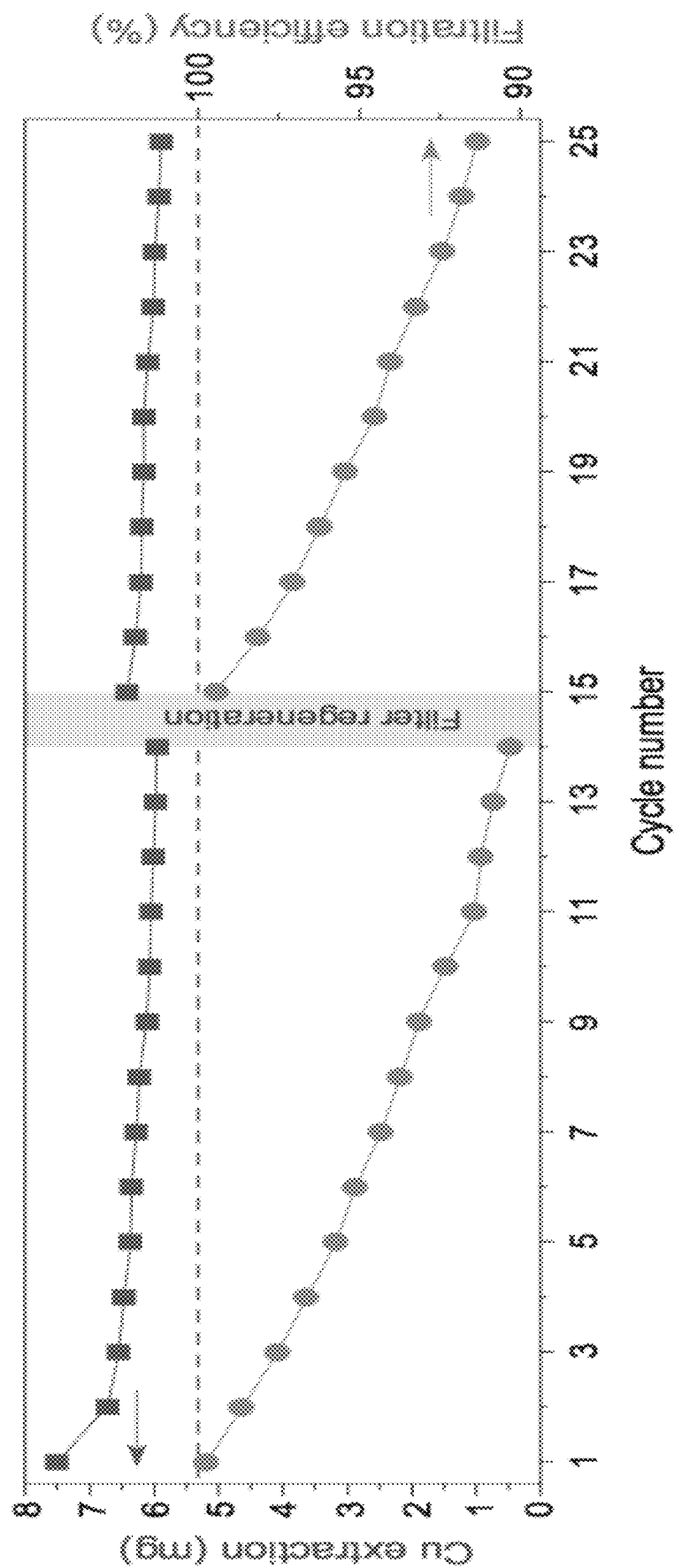
FIGS. 4A-C shows according to an exemplary embodiment of the invention long-term performance and plant assay.

The long-term performance of the AACE filter and the recyclability of EDTA solution were evaluated in FIG. 4A. Twenty-five equivalent soil samples were prepared by spiking with 10,000 ppm Cu (see Methods). In each cycle, the same EDTA solution was used to wash a spiked soil sample at a flow rate of 0.5 ml/min followed by AACE filtration. The filtration efficiency and the mass of Cu washed out in each cycle were examined. After 25 cycles, the recycled EDTA solution had only 20 percent decay in its extraction ability (from ~7.5 mg to ~6 mg), illustrating that there is no accumulation of EDTA in the treated soil. Considering that our soil samples have a water retention capacity of 40%, the residue EDTA concentration in the treated soil would be 12 mmol/kg. The AACE filtration efficiency decreased from ~100% to ~90% after 14 washing cycles. The SEM image shown in FIG. 9A in Appendix B of U.S. Provisional Patent Application 62/832,677 filed Apr. 11, 2019, which is incorporated herein by reference, shows the morphology of the Ami-PC electrode after 14 cycles, which was covered by Cu particles with a fair number of pores blocked, indicating that the filtration efficiency decrease is mainly due to the loss of surface area and chelation sites after long-term operation. To demonstrate the regeneration of the AACE filter, 0.1 M HCl was used as the elusion solution with a DC reverse bias of 1 V applied to the electrode. After the elusion was process, the filtration efficiency of the AACE filter returned to 100%. The SEM image in FIG. 9B in Appendix B of US Provisional Patent Application 62/832,677 filed Apr. 11, 2019, which is incorporated herein by reference, shows that all the Cu particles were recovered after elution and no damage was observed to the Ami-PC electrode.

Figure 4B:
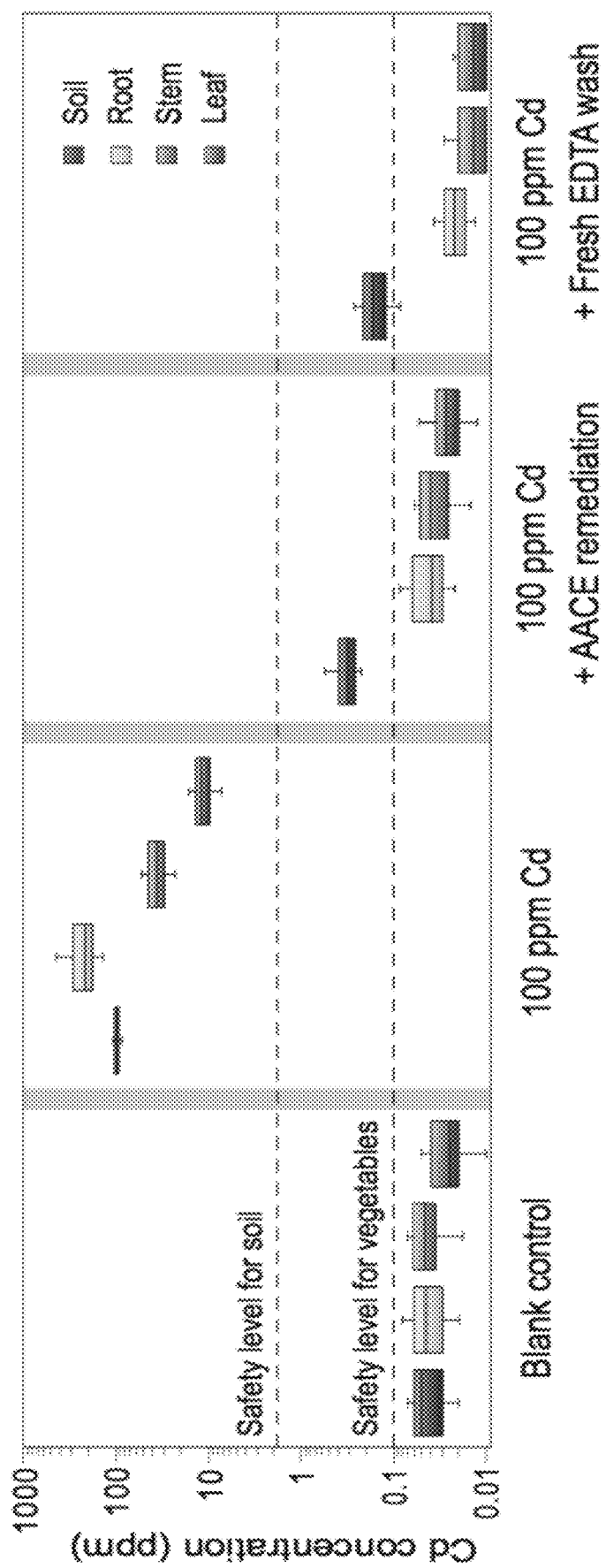
Figure 4C:
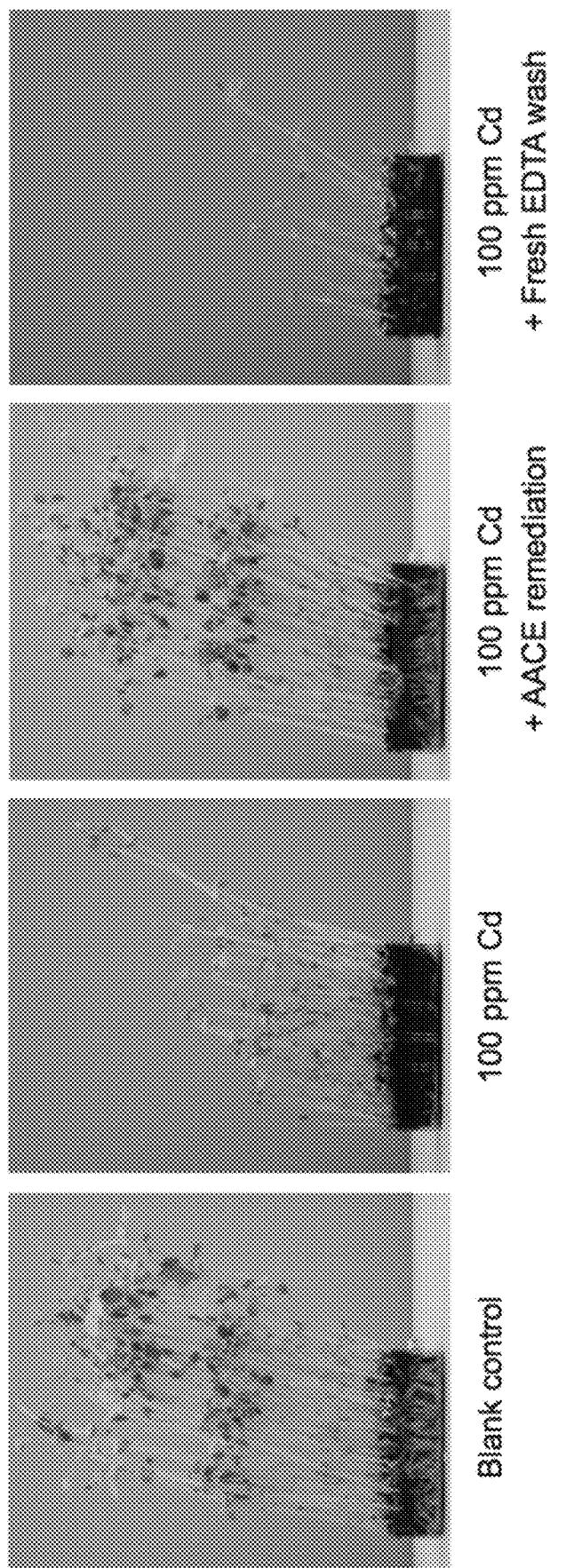

Finally, plant assay using pea (*Pisum sativum*) sprouts were conducted to demonstrate the feasibility of the AACE method for agricultural land remediation (FIG. 4B and FIG. 4C), since dietary intake is the main route of heavy metal exposure, especially in crop vegetables planted on heavy metal contaminated soil 28. In each pot, coir was mixed into the treated soil with a mass ratio of 1:9 to improve drainage. In the Cd positive control (soil spiked with 100 ppm Cd), most of the Cd accumulated in the root, with the median of Cd concentrations in roots, shoots and leaves to be 210, 35 and 11 ppm, respectively. For the spiked soil sample remediated by the AACE method, the soil Cd concentration decreased to 0.25 ppm, while the concentrations of Cd in different parts of the planted pea sprouts were all below 0.1 ppm, which is the safety level for Cd in vegetables according to International Food Standards. Cd accumulation in the root was not observed for the treated soil, because the residue Cd in the soil has very low bioavailability, considering that the EDTA solution cannot even leach it out. Moreover, no difference in pea growth such as shoot height and leaf size was observed between the blank control and the AACE remediated one. On the contrary, using fresh EDTA solution to wash the contaminated soil not only consumed a large amount of EDTA solution but also caused excessive soil nutrient loss, as was made evident by the stunted pea growth.

For detailed materials and methods, the reader is referred to Appendix A of U.S. Provisional Patent Application 62/832,677 filed Apr. 11, 2019, which is incorporated herein by reference. Specifics can be found on ami-PC electrode fabrication, characterization of soil properties, soil remediation experiment, material characterization, long-term performance evaluation, and plant assay.

What is claimed is:

1. A method for soil remediation comprising:
   (a) providing a recirculating soil washing system that provides a chelating agent to soil being treated in a treatment tank;
   (b) providing a filter in the treatment tank, wherein the filter includes a working electrode and a ground electrode sandwiching a separator; and (c) providing an alternating current (AC) electrical input between the working electrode and the ground electrode, wherein the AC electrical input has a positive and a negative voltage excursion, wherein chelation sites on the working electrode bind heavy metal cations from the soil being treated when the working electrode is positively biased with respect to the ground electrode, and wherein the heavy metal cations on the working electrode are electrochemically reduced and form solid particles when the working electrode is negatively biased with respect to the ground electrode.

2. The method as set forth in claim 1, wherein the filter is an asymmetrical alternating current electrochemistry filter.

3. The method as set forth in claim 1, wherein the chelating agent is an ethylenediaminetetraacetic acid (EDTA) solution, a dimercaptosuccinic acid (DMSA) solution, a 2,3-dimercaptopropanesulfonic acid (DMPS) solution, an alpha lipoic acid (ALA) solution, or a thiamine tetrahydrofurfuryl disulfide (TTFD) solution.

4. The method as set forth in claim 1, wherein the alternating current (AC) electrical input ranges from −10V to +5V.

5. The method as set forth in claim 1, wherein the alternating current (AC) electrical input ranges from −20V to +20V.

6. The method as set forth in claim 1, wherein the working electrode is positively biased for a period ranging from 0.1 to 1 ms.

7. The method as set forth in claim 1, of the working electrode is negatively biased for a period ranging from 1 to 5 ms.

8. The method as set forth in claim 1, wherein one or more of the heavy metal cations Cu, Pb, Cd, Hg, Cr, As, Ni, Zn, Fe, or a combination thereof.

9. The method as set forth in claim 1, wherein the alternating current (AC) electrical input has a sinusoidal waveform, a stepwise waveform or a biphasic waveform.

\* \* \* \* \*